United States Patent
Sakai et al.

(10) Patent No.: US 8,696,139 B2
(45) Date of Patent: Apr. 15, 2014

(54) PROJECTOR HAVING A PLURALITY OF COOLING FANS

(75) Inventors: Yohei Sakai, Suwa (JP); Norikazu Kadotani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 260 days.

(21) Appl. No.: 13/049,132

(22) Filed: Mar. 16, 2011

(65) Prior Publication Data

US 2011/0242500 A1 Oct. 6, 2011

(30) Foreign Application Priority Data

Mar. 30, 2010 (JP) .................................. 2010-077516

(51) Int. Cl.
*G03B 21/18* (2006.01)

(52) U.S. Cl.
USPC ................... 353/58; 353/52; 353/57; 353/60; 353/61; 353/119; 362/294

(58) Field of Classification Search
USPC ............ 353/52, 57–58, 60–61, 119; 348/748, 348/789–790, 794; 362/294, 345, 373; 349/5, 7–9, 161
See application file for complete search history.

(56) References Cited

U.S. PATENT DOCUMENTS

| | | | |
|---|---|---|---|
| 6,334,686 B1 | 1/2002 | Shiraishi et al. | |
| 6,481,854 B1 * | 11/2002 | Sugawara et al. | 353/52 |
| 6,832,837 B2 * | 12/2004 | Suzuki et al. | 353/61 |
| 6,834,985 B2 * | 12/2004 | Chou et al. | 362/373 |
| 6,986,582 B2 * | 1/2006 | Kobayashi | 353/61 |
| 7,393,109 B2 * | 7/2008 | Arboix | 353/57 |
| 7,845,803 B2 * | 12/2010 | Lv et al. | 353/52 |
| 2008/0252859 A1 * | 10/2008 | Nagahata et al. | 353/61 |
| 2011/0075111 A1 | 3/2011 | Noda et al. | |

FOREIGN PATENT DOCUMENTS

| | | |
|---|---|---|
| CN | 102033399 A | 4/2011 |
| JP | A 2000-231154 | 8/2000 |
| JP | A-2005-274744 | 10/2005 |
| JP | A 2005-338236 | 12/2005 |
| JP | A 2009-075212 | 4/2009 |
| JP | A-2009-296836 | 12/2009 |

* cited by examiner

*Primary Examiner* — Georgia Y Epps
*Assistant Examiner* — Sultan Chowdhury
(74) *Attorney, Agent, or Firm* — Oliff & Berridge, PLC

(57) ABSTRACT

A projector includes: a cooling device which supplies cooling air to a cooling target, wherein the cooling device includes a plurality of cooling fans each of which discharges cooling air, and a plurality of ducts each one end of which is connected with the corresponding one of the plural cooling fans to introduce the cooling air toward the cooling target in directions different from each other, and the plural ducts communicate with each other at the other end and have an outlet port through which the cooling air flows out.

8 Claims, 4 Drawing Sheets

PROJECTOR HAVING A PLURALITY OF COOLING FANS

CROSS-REFERENCE

The entire disclosure of Japanese Patent Application No. 2010-077516 filed Mar. 30, 2010 is expressly incorporated by reference herein.

BACKGROUND

1. Technical Field

The present invention relates to a projector.

2. Related Art

A projector which includes a cooling fan for drawing cooling air from the outside and discharging the drawn air, and a duct connected with the cooling fan for guiding the cooling air toward a light modulation device as a cooling target is known (for example, see JP-A-2005-338236).

According to the technology shown in JP-A-2005-338236, one end of the duct is connected with the cooling fan, and the other end extends to the vicinity of the position of the light modulation device such that the cooling air discharged from the cooling fan can be guided toward the light modulation device. The cooling air flows out from an outlet port formed at the other end of the duct toward the light modulation device in the upward direction from below to cool the light modulation device. More specifically, the cooling air discharged from the cooling fan flows through the inside of the duct in the direction perpendicular to the optical axis of light entering the light modulation device, and then collides with the wall surface of the duct at the other end. The cooling air after collision with the wall surface changes its channel direction, and flows out through the outlet port.

According to the technology disclosed in JP-A-2005-338236, however, the cooling air colliding with the wall surface of the duct at the other end generates friction on the wall surface, and lowers its flow speed due to pressure loss thus produced. In this case, the flow amount of the cooling air flowing from the outlet port decreases by the flow speed drop of the cooling air. Under this condition, a sufficient flow amount of cooling air for cooling the cooling target in a preferable condition is difficult to be supplied to the cooling target.

SUMMARY

An advantage of some aspects of the invention is to provide a projector capable of improving the efficiency of cooling a cooling target.

A projector according to an aspect of the invention includes a cooling device which supplies cooling air to a cooling target. The cooling device includes a plurality of cooling fans each of which discharges cooling air, and a plurality of ducts each one end of which is connected with the corresponding one of the plural cooling fans to introduce the cooling air toward the cooling target in directions different from each other. The plural ducts communicate with each other at the other end and have an outlet port through which the cooling air flows out.

According to this structure, the respective ducts introduce the cooling airs discharged from the cooling fans toward the cooling target in directions different from each other. In addition, the plural ducts communicate with each other at the other end and have the outlet port through which the cooling air flows out. In this arrangement, the respective cooling airs discharged from the plural cooling fans are guided from the one end to the other end of each of the ducts, and collide with each other at the other end at the position of the outlet port. Then, the cooling airs after collision with each other flow out from the outlet port toward the cooling target. According to the structure in this aspect of the invention which changes the channel directions of the cooling airs discharged from the cooling fans by collision between each other, the pressure losses of the cooling airs become lower than the pressure loss of a structure which changes the channel direction by collision with the wall surface or the like of the duct in the related art described above. Thus, the flow speeds of the cooling airs do not drop. More specifically, the cooling airs can be guided from the outlet port toward the cooling target while maintaining the same flow speeds even after the collision. In this case, the flow amounts of the cooling airs introduced toward the cooling target do not decrease, which allows sufficient flow amounts of the cooling airs to be supplied to the cooling target. Accordingly, the efficiency of cooling the cooling target improves.

It is preferable that the two ducts are provided as the plural ducts, and that the two ducts are so constructed as to communicate with each other in a linear shape at the position of the outlet port in the above aspect of the invention.

When the cooling airs discharged from the respective cooling fans collide with each other at the position of the outlet port in oblique directions, for example, a part of the cooling airs flows to the position of the wall surface of the duct and changes the channel direction on the wall surface to flow out from the outlet port toward the cooling target. In this case, there is a possibility that this cooling air generates friction on the wall surface and thus lowers the flow speed by pressure loss thus produced.

According to this aspect of the invention, however, the respective ducts are so constructed as to communicate with each other in a linear shape at the position of the outlet port. In this case, the cooling airs discharged from the respective cooling fans collide with each other at the position of the outlet port in directions opposed to each other. In this case, a part of the cooling airs does not flow to the position of the wall surface of the duct. Thus, the cooling airs after the collision can flow toward the cooling target from the outlet port without lowering the flow speeds, which further improves the efficiency of cooling the cooling target.

It is preferable that the cross-sectional area of the duct cut along a plane perpendicular to the flow direction of the cooling air decreases in the direction toward the outlet port in the above aspect of the invention.

According to this structure, the cross-sectional area of the duct decreases in the direction toward the outlet port. Thus, the flow speeds of the cooling airs discharged from the plural cooling fans increase in the direction toward the outlet port. In this case, the flow amounts of the cooling airs supplied to the cooling target can be raised in accordance with the increase in the flow speeds of the cooling airs at the position of the outlet port. Accordingly, the efficiency of cooling the cooling target further improves.

BRIEF DESCRIPTION OF THE DRAWINGS

The invention will be described with reference to the accompanying drawings, wherein like numbers reference like elements.

DESCRIPTION OF EXEMPLARY EMBODIMENT

An exemplary embodiment according to the invention is hereinafter described with reference to the drawings.
Structure of Projector FIG. 1 illustrates the general structure of a projector 1 according to this embodiment.

Figure 1:
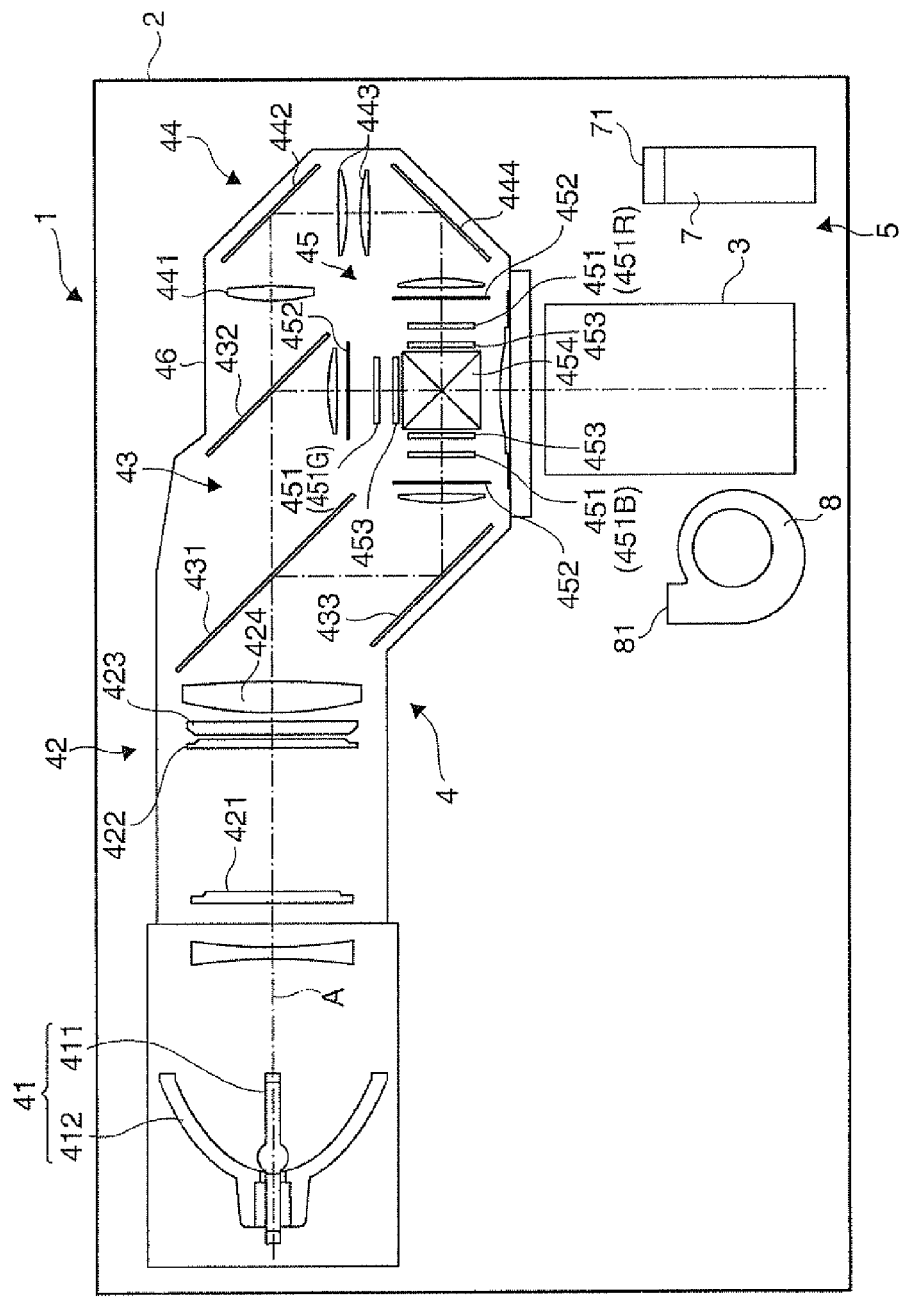
FIG. 1 illustrates the general structure of a projector according to an embodiment of the invention.

FIG. 1 schematically shows the general structure of the projector 1.

In the following description, the "front surface" side corresponds to the projection side of the projector 1 (the side where a projection lens 3 is disposed), and the "rear surface" side corresponds to the side opposite to the front surface side. The top surface side corresponds to the front side with respect to the sheet surface of FIG. 1, and the bottom surface side corresponds to the depth side with respect to the sheet surface. The "left" side and the "right" side in the following description correspond to the left and right as viewed from the front surface with the top surface of the projector 1 positioned on the upper side.

The projector 1 modulates light according to image information inputted from an external device or the like, and projects the modulated light onto a screen (not shown) to display a projection image thereon. As illustrated in FIG. 1, the projector 1 includes an external housing 2 having a substantially parallelepiped shape, the projection lens 3, an optical unit 4, and a cooling device 5 for cooling the respective components within the projector 1. The projector 1 further includes a power source unit for supplying electric power to the respective components within the projector 1, a control device for controlling the respective components within the projector 1, and others, though these units are not specifically shown in the figure.
Structure of Optical Unit The optical unit 4 has a substantially L shape in the plan view extending from the left to the right along the rear surface of the external housing 2 with the front end in the extending direction bended to project toward the front surface side.

As illustrated in FIG. 1, the optical unit 4 includes: a light source device 41 having a light source lamp 411 and a reflector 412; an illumination device 42 having lens arrays 421 and 422, a polarization converting element 423, and a stacking lens 424; a color separation device 43 having dichroic mirrors 431 and 432, and a reflection mirror 433; a relay device 44 having an entrance side lens 441, a relay lens 443, and reflection mirrors 442 and 444; an optical device 45 having three light modulation devices 451 (light modulation device 451R for red light, light modulation device 451G for green light, and light modulation device 451B for blue light), three entrance side polarization plates 452, and three exit side polarization plates 453 as cooling targets, and a cross dichroic prism 454; and an optical component housing 46.

According to the optical unit 4 thus constructed, light emitted from the light source device 41 passes through the illumination device 42, and is separated into three color lights in R, G, and B by the color separation device 43. The respective separated color lights are modulated by the corresponding light modulation devices 451 according to image information, and combined by the cross dichroic prism 454 to be expanded and projected onto the screen (not shown) by the projection lens 3.

Figure 2:
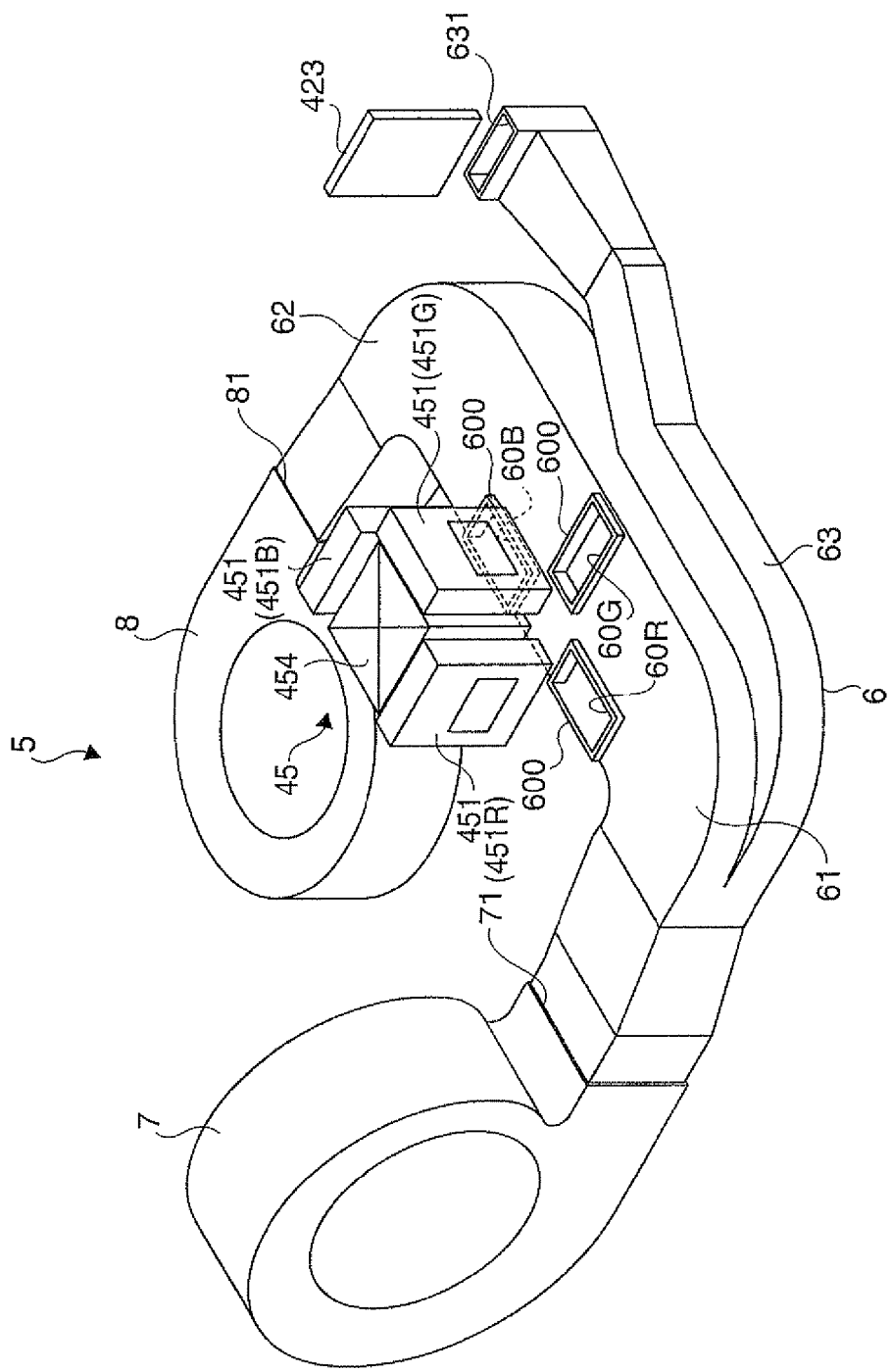
FIG. 2 is a perspective view schematically illustrating a cooling device according to the embodiment.

The respective optical components 41 through 46 are parts of an optical system included in any of various types of projectors generally available, and therefore are not specifically described herein.
Structure of Cooling Device FIG. 2 is a perspective view illustrating the main part in this embodiment. More specifically, FIG. 2 is a perspective view showing the cooling device 5 and the optical device 45 positioned for the cooling device 5 as viewed from the rear surface. FIG. 2 does not show the entrance side polarization plates 452 and the exit side polarization plates 453 for easy understanding of the figure. This applies to other figures referred to later.

The cooling device 5 supplies cooling air to the light modulation devices 451, the entrance side polarization plates 452 (see FIG. 1), the exit side polarization plates 453 (see FIG. 1), and others as the cooling targets. As illustrated in FIG. 2, the cooling device 5 has a duct 6, and a first cooling fan 7 and a second cooling fan 8 as cooling fans.
Structure of Duct The duct 6 has a substantially U shape in the plan view whose one end extended toward the rear surface is bended in the direction perpendicular to the extending direction of the end of the duct 6 to extend along the rear surface, and is further bended in a direction substantially parallel with the extending direction of the end of the duct 6 to extend toward the front surface. The duct 6 has a first duct portion 61 and a second duct portion 62 as the duct main body, and a third duct portion 63 positioned on the outside of the area of the first duct portion 61 extending along the rear surface, all of which duct portions 61, 62, and 63 are formed integrally with each other.

The detailed structures of the first duct portion 61, the second duct portion 62, and the third duct portion 63 will be described later.
Structure of Cooling Fan As illustrated in FIG. 1, the first cooling fan 7 is disposed on the right side of the projection lens 3. On the other hand, the second cooling fan 8 is disposed on the left side of the projection lens 3 as illustrated in FIG. 1. According to this embodiment, each of the first and second cooling fans 7 and 8 is constituted by a sirocco fan.

The first and second cooling fans 7 and 8 have air intake ports (not shown) through which air is introduced, and air discharge ports 71 and 81, respectively, through which air is discharged.

The air intake ports of the respective cooling fans 7 and 8 are disposed opposed to an air inlet port (not shown) formed on the external housing 2 such that air can be introduced from the outside of the projector 1 through the air inlet port into the air intake ports of the cooling fans 7 and 8.

As illustrated in FIG. 2, the air discharge port 71 of the first cooling fan 7 is connected with one end of the first duct portion 61, while the air discharge port 81 of the second cooling fan 8 is connected with one end of the second duct portion 62.

Figure 3:
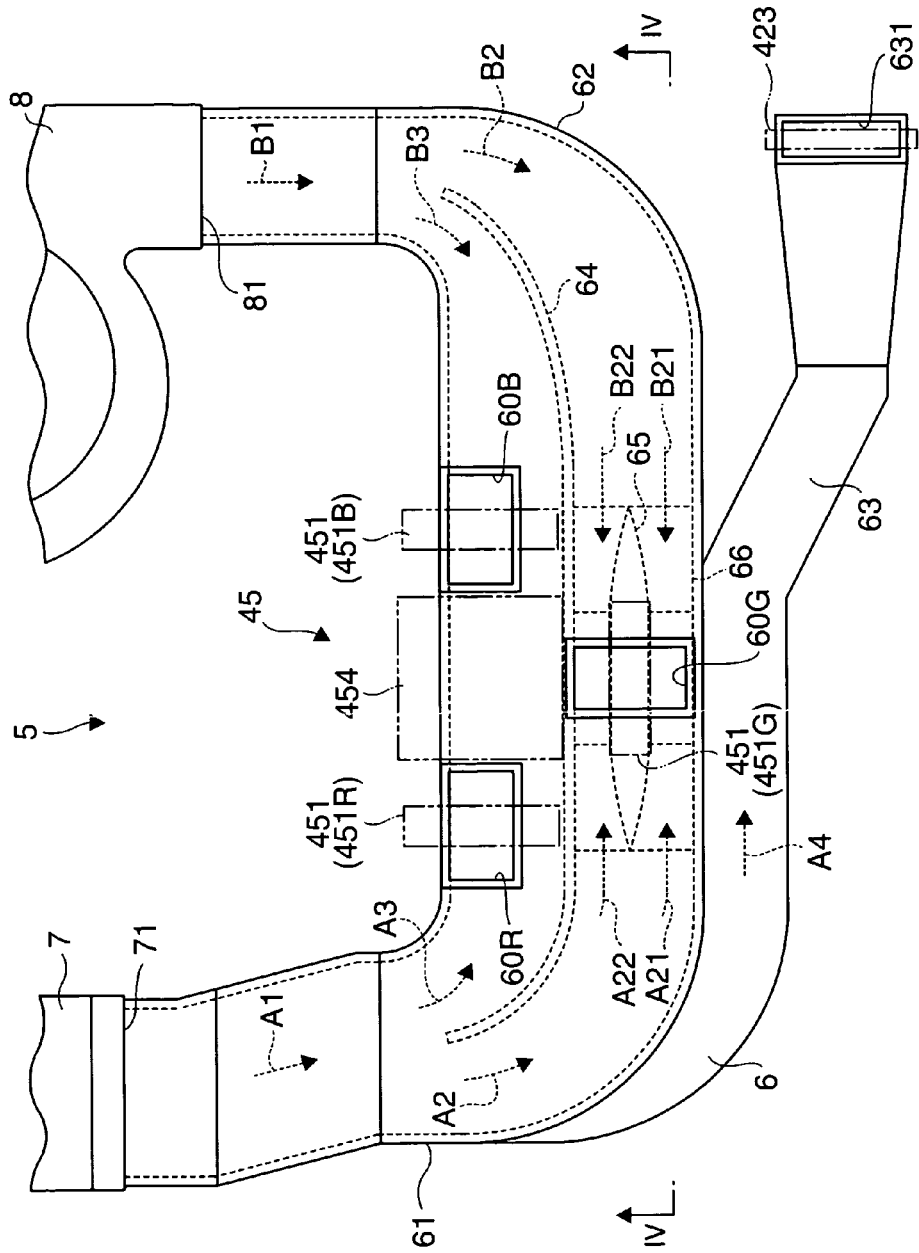
FIG. 3 is a plan view schematically illustrating the cooling device according to the embodiment.

FIG. 3 is a plan view of the cooling device 5. More specifically, FIG. 3 is a plan view illustrating the cooling device 5 and the optical device 45 positioned for the cooling device 5 as viewed from the top surface. Broken lines with arrows indicate the flow direction of cooling air.

As illustrated in FIG. 3, the first cooling fan 7 draws the outside air, and discharges the drawn air as cooling air Al toward the light modulation device 451G for green light, the light modulation device 451R for red light, the entrance side polarization plates 452, and the exit side polarization plates 453 as the cooling targets through the first duct portion 61.

Similarly, as illustrated in FIG. 3, the second cooling fan 8 draws the outside air through the air inlet port, and discharges the drawn air as cooling air B1 toward the light modulation device 451G for green light, the light modulation device 451B for blue light, the entrance side polarization plates 452, and the exit side polarization plates 453 as the cooling targets through the second duct portion 62.

Structures of First Duct Portion and Second Duct Portion

The first duct portion 61 and the second duct portion 62 guide the cooling air A1 discharged from the first cooling fan 7 and the cooling air B1 discharged from the second cooling fan 8, respectively, toward the vicinities of the respective light modulation devices 451, the entrance side polarization plates 452, and the exit side polarization plates 453 in directions different from each other.

A rectangular red light section cooling outlet port 60R is formed on the top surface of the first duct portion 61 at the other end. In addition, a rectangular blue light section cooling outlet port 60B is formed on the top surface of the second duct portion 62 at the other end. As illustrated in FIGS. 2 and 3, a green light section cooling outlet port 60G as a rectangular air outlet port is formed on the top surfaces of the respective duct portions 61 and 62 at the other ends where the duct portions 61 and 62 communicate with each other, that is, in the vicinity of the position of the light modulation device 451G for green light.

The respective duct portions 61 and 62 are so constructed as to communicate with each other in a linear shape at the position of the green light section cooling outlet port 60G.

The cooling airs A1 and B1 discharged from the cooling fans 7 and 8 flow out from the respective outlet ports 60G, 60R, and 60B to cool the light modulation devices 451, the entrance side polarization plates 452, and the exit side polarization plates 453.

A straightening rib 600 projecting toward the top surface is provided on each of the outlet ports 60G, 60R, and 60B in such a manner as to surround the outlet ports 60G, 60R, and 60B on the top surface side. The straightening rib 600 is a component for straightening each flow direction of the cooling airs A1 and B1 traveling toward the cooling targets in the upward direction from below.

Figure 4:
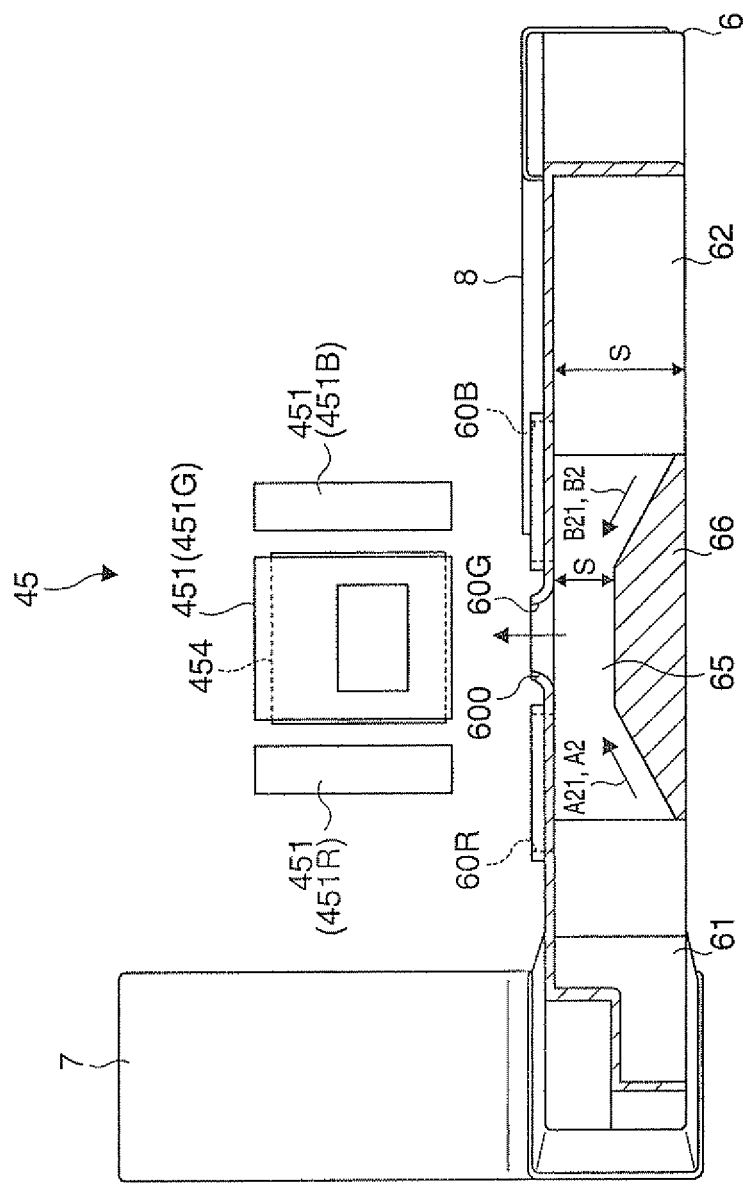
FIG. 4 is a cross-sectional view schematically illustrating the cooling device according to the embodiment.

FIG. 4 is a cross-sectional view of the duct 6 taken along a line IV-IV in FIG. 3. Solid lines with arrows in FIG. 4 indicate the flow direction of cooling air.

As illustrated in FIGS. 3 and 4, the first duct portion 61 and the second duct portion 62 have a first straightening plate 64, a second straightening plate 65, and an inclined portion 66.

The first straightening plate 64 is curved in accordance with the shapes of the first duct portion 61 and the second duct portion 62. The first straightening plate 64 extends from the bended portion of the first duct portion 61 at the one end (on the first cooling fan 7 side) along the rear surface of the first duct portion 61 to reach the bended portion of the second duct portion 62 at the one end (on the second cooling fan 8 side). The first straightening plate 64 branches the cooling air A1 discharged from the first cooling fan 7 into cooling airs A2 and A3, and also branches the cooling air B1 discharged from the second cooling fan 8 into cooling airs B2 and B3.

The cooling airs A2 and B2 pass through the first duct portion 61 and the second duct portion 62, respectively, to reach the green light section cooling outlet port 60G. Then, the cooling air A2 and the cooling air B2 collide with each other in the opposed directions at the position where the respective duct portions 61 and 62 communicate with each other, that is, the position of the green light section cooling outlet port 60G, and flow out through the green light section cooling outlet port 60G toward the light modulation device 451G for green light, the entrance side polarization plate 452, and the exit side polarization plate 453 in the upward direction from below. The discharge amounts of the cooling airs A1 and B1 from the cooling fans 7 and 8 are determined such that the cooling airs A2 and B2 collide with each other at the position of the green light section cooling outlet port 60G. More specifically, the discharge amounts of the cooling airs A1 and E1 are determined such that the flow amounts of the cooling airs A2 and B2 introduced toward the green light section cooling outlet port 60G become equal. According to this embodiment, the discharge amount of the cooling air A1 from the first cooling fan 7 is set larger than the discharge amount of the cooling air B1 from the second cooling fan 8. This is because a part of the cooling air A1 discharged from the first cooling fan 7 is also guided toward the third duct portion 63 described later.

The cooling air A3 travels along the first duct portion 61 and reaches the red light section cooling outlet port 60R, and then flows out from the red light section cooling outlet port 60R toward the light modulation device 451R for red light, the entrance side polarization plate 452, and the exit side polarization plate 453.

The cooling air B3 travels along the second duct portion 62 and reaches the blue light section cooling outlet port 60B, and then flows out from the blue light section cooling outlet port 60B toward the light modulation device 451B for blue light, the entrance side polarization plate 452, and the exit side polarization plate 453.

As illustrated in FIGS. 3 and 4, the second straightening plate 65 is disposed in the range from the red light section cooling outlet port 60R to the blue light section cooling outlet port 60B in a direction substantially perpendicular to the light entering the light modulation device 451G for green light in such a condition as to cross over the green light section cooling outlet port 60G. In this arrangement, the second straightening plate 65 further branches the cooling air A2 into cooling airs A21 and A22, and branches the cooling air B2 into cooling airs B21 and B22.

The cooling airs A21 and B21 travel toward the entrance side of the green light section cooling outlet port 60G (toward the optical path upstream side of light entering the light modulation device 451G for green light) to cool the entrance side polarization plate 452 and the light entrance surface of the light modulation device 451G for green light.

The cooling airs A22 and B22 travel toward the exit side of the green light section cooling outlet port 60G (toward the optical path downstream side of light entering the light modulation device 451G for green light) to cool the light exit surface of the light modulation device 451G for green light and the exit side polarization plate 453.

As illustrated in FIGS. 3 and 4, the inclined portion 66 is disposed on the first duct portion 61 and the second duct portion 62 at a position opposed to the green light section cooling outlet port 60G in the range where the second straightening plate 65 is provided. The inclined portion 66 is constructed such that the projection of the inclined portion 66 from the bottom surface toward the top surface increases in the direction toward the green light section cooling outlet port 60G, and that the area of the inclined portion 66 opposed to the green light section cooling outlet port 60G becomes flat. That is, a cross-sectional area S of the first duct portion 61 and the second duct portion 62 (cross-sectional area cut along a plane perpendicular to the flow direction of cooling air) decreases in the direction toward the green light section cooling outlet port 60G, which increases the flow speeds of the cooling airs A2 and B2. Thus, the cooling airs A2 and B2 travel along the inclined surface of the inclined portion 66 while increasing the flow speeds, collide with each other on the flat surface in the directions opposed to each other, and then flow out through the green light section cooling outlet port 60G toward the entrance side polarization plate 452, the light modulation device 451G for green light, and the exit side polarization plate 453 in the upward direction from below.

Structure of Third Duct

As illustrated in FIGS. 2 and 3, the third duct portion 63 draws cooling air A4 as a part of the cooling air Al discharged from the first cooling fan 7, and guides the cooling air A4 toward the polarization converting element 423. A rectangular outlet port 631 through which the cooling air A4 passes toward the polarization converting element 423 is formed on the top surface of the third duct portion 63.

According to the projector 1 in this embodiment, the following advantages can be offered.

In this embodiment, the respective cooling airs A2 and B2 discharged from the cooling fans 7 and 8 collide with each other at the position of the green light section cooling outlet port 60G. Then, the cooling airs A2 and B2 after collision flow out through the green light section cooling outlet port 60G toward the light modulation device 451G for green light. According to the structure in this embodiment which changes the channel directions of the cooling airs A2 and B2 discharged from the cooling fans 7 and 8 by collision between each other, the pressure losses of the cooling airs A2 and B2 become lower than the pressure loss of a structure which changes the channel direction by collision with the wall surface or the like of the duct in the related art described above. Thus, the flow speeds of the cooling airs A2 and B2 do not drop. More specifically, the cooling airs A2 and B2 can flow from the green light section cooling outlet port 60G toward the light modulation device 451G for green light while maintaining the same flow speeds even after the collision. In this case, the flow amounts of the cooling airs A2 and B2 introduced toward the light modulation device 451G for green light do not decrease, which allows sufficient flow amounts of the cooling airs A2 and B2 to be supplied to the light modulation device 451G for green light. Accordingly, the efficiency of cooling the light modulation device 451G for green light improves.

Moreover, the cooling airs A2 and B2 discharged from the respective cooling fans 7 and 8 collide with each other at the position of the green light section cooling outlet port 60G in directions opposed to each other. Thus, a part of the respective cooling airs A2 and B2 does not flow to the position of the wall surface of the duct 6 unlike a structure in which the cooling airs A2 and B2 collide with each other in oblique directions, for example. In this case, the cooling airs A2 and B2 flow from the green light section cooling outlet port 60G toward the light modulation device 451G for green light without lowering the flow speeds of the cooling airs A2 and B2 even after the collision. Accordingly, the efficiency of cooling the light modulation device 451G for green light further improves.

Furthermore, the cross-sectional area S of the first duct portion 61 decreases in the direction toward the green light section cooling outlet port 60G. Thus, the flow speeds of the cooling airs A2 and B2 discharged from the cooling fans 7 and 8 increase in the direction toward the green light section cooling outlet port 60G. In this case, the flow amounts of the cooling airs A2 and B2 supplied to the light modulation device 451G for green light can be raised in accordance with the increase in the flow speeds of the cooling airs A2 and B2 at the position of the green light section cooling outlet port 60G. Accordingly, the efficiency of cooling the light modulation device 451G for green light further improves.

When the cooling airs A2 and 52 discharged from the cooling fans 7 and 8 collide with each other at the position of the green light section cooling outlet port 60G in oblique directions, there is a possibility that the cooling airs A2 and B2 after the collision do not flow from the green light cooling outlet port 60G toward the light modulation device 451G for green light in the upward direction from below.

According to this embodiment, however, the cooling airs A2 and B2 discharged from the cooling fans 7 and 8 collide with each other at the position of the green light section cooling outlet port 60G in directions opposed to each other. Thus, the cooling airs A2 and B2 after the collision flow from the green light section cooling outlet port 60G toward the light modulation device 451G for green light in the upward direction from below. Accordingly, the efficiency of cooling the light modulation device 451G for green light further improves.

Modification of Embodiment

The invention is not limited to the embodiment described herein but may be practiced otherwise without departing from the scope of the invention. Therefore, modifications, improvements and the like including the following changes may be made.

According to this embodiment, the cooling targets are cooled by the two cooling fans 7 and 8. However, the number of the cooling fans for cooling the cooling targets may be three or more.

According to this embodiment, the cooling airs A2 and B2 collide with each other at the position of the green light section cooling outlet port 60G in directions opposed to each other. However, the cooling airs A2 and B2 may collide with each other in other directions.

According to this embodiment, the cross-sectional area S of the first duct portion 61 and the second duct portion 62 is decreased in the direction toward the green light section cooling outlet port 60G by providing the inclined portion 66. However, the cross-sectional area S may be reduced by decreasing the diameters of the first duct portion 61 and the second duct portion 62 without forming the inclined portion 66.

According to this embodiment, the optical unit 4 has a substantially L shape in the plan view. However, an optical unit having a substantially U shape in the plan view may be employed.

According to this embodiment, the transmission type liquid crystal panels are used. However, reflection type liquid crystal panel may be employed.

According to this embodiment, the projector 1 including the liquid crystal panels as the light modulation devices has been discussed as an example. However, other types of light modulation device may be employed as long as they can form an optical image by modulating received light. For example, the invention is applicable to a projector which includes a light modulation device other than the liquid crystal type such as a device containing micromirrors.

According to this embodiment, the front type projector 1 whose projection direction of image light onto the projection surface almost agrees with the viewing direction of an image formed by the image light has been discussed as an example. However, the invention is applicable to a rear type projector whose projection direction and viewing direction are opposite to each other.

The light source device 41 is not limited to the unit which includes the light source lamp 411 but may be a unit which contains a solid light source such as an LED (light emitting diode).

The technology of the invention is appropriately incorporated in a projector used for presentation, home theater, and for other purposes.

What is claimed is:

1. A projector comprising:
   a plurality of light modulation devices, each modulating light in accordance with image information;
   a first fan discharging a first cooling air;
   a second fan discharging a second cooling air;
   a first duct connected at one end with the first fan, the first cooling air flowing through the first duct from the first fan; and
   a second duct connected at one end with the second fan, the second cooling air flowing through the second duct from the second fan, wherein
   the first cooling air flowing through the first duct and the second cooling air flowing through the second duct collide at a position where the first duct and the second duct communicate with each other at an other end of the first duct and an other end of the second duct, and
   a light modulation device of the plurality of light modulation devices is cooled by the first cooling air and the second cooling air, a flow direction of the first cooling air and a flow direction of the second cooling air being changed by collision of the first cooling air and the second cooling air.

2. The projector according to claim 1, wherein the first duct and the second duct communicate with each other in a linear shape at the position in which the first cooling air and the second cooling air collide.

3. The projector according to claim 1, wherein the first duct and the second duct share an outlet port through which the first cooling air and the second cooling air flow out, and
   the cross-sectional area obtained by cutting the first duct and the second duct along a plane perpendicular to the flow direction of the first cooling air and the second cooling air decreases in the direction toward the outlet port.

4. The projector according to claim 1, wherein the light modulation device of the plurality of light modulation devices is configured to modulate green light.

5. The projector according to claim 3, wherein
   the first duct includes an inclined portion positioned to oppose the first outlet port, the inclined portion having an inclined surface that is inclined toward a disposed side of the first outlet port at an upstream side of the first outlet port, and
   the second duct includes an inclined portion positioned to oppose the second outlet port, the inclined portion having an inclined surface that is inclined toward a disposed side of the second outlet port at an upstream side of the second outlet port.

6. The projector according to claim 1, wherein
   the first cooling air and the second cooling air cool an entrance side and an exit side of the light modulation device.

7. The projector according to claim 6, wherein
   the first duct and the second duct share a straightening plate that branches the first cooling air and the second cooling air into the entrance side and the exit side of the light modulation device.

8. The projector according to claim 7, wherein
   the straightening plate is disposed at the position crossing over the outlet port in direction perpendicular to the light entering the light modulation device, and
   the straightening plate separates the outlet port into a first outlet port introducing the combined cooling air toward the entrance side and a second outlet port introducing the combined cooling air toward the exit side.

* * * * *